United States Patent [19]
Takano et al.

[11] Patent Number: 5,516,397
[45] Date of Patent: May 14, 1996

[54] POLYPROPYLENE-LAMINATED STEEL SHEET AND PRODUCTION THEREOF

[75] Inventors: Koujiro Takano; Mamoru Ishii, both of Hyogo; Masaharu Mito, Yamaguchi; Satoshi Akiyama, Chiba, all of Japan

[73] Assignees: Nippon Steel Corporation; Mitsui Petrochemical Industries, Ltd., both of Tokyo, Japan

[21] Appl. No.: 3,808

[22] Filed: Jan. 13, 1993

[30] Foreign Application Priority Data

Jan. 17, 1992 [JP] Japan .................... 4-025905

[51] Int. Cl.$^6$ .................. B29C 47/00; B65C 9/25; B32B 15/04; B32B 27/18
[52] U.S. Cl. .................. 156/244.23; 156/244.11; 156/244.24; 156/322; 264/171.11; 264/171.14; 264/171.22; 428/457; 428/461
[58] Field of Search .................. 428/457, 461, 428/459, 461, 332, 341, 334; 427/318, 374.4; 156/244.11, 244.23, 244.24, 498, 500, 322, 309.6, 309.9; 264/171, 265, 345, 348, 171.11, 171.14, 171.22

[56] References Cited

FOREIGN PATENT DOCUMENTS

| | | |
|---|---|---|
| 0031701 | 7/1981 | European Pat. Off. . |
| 0078174 | 5/1983 | European Pat. Off. . |
| 0238974 | 9/1987 | European Pat. Off. . |
| 0297741 | 1/1989 | European Pat. Off. . |
| 0312309 | 4/1989 | European Pat. Off. . |
| 1392590 | 4/1975 | United Kingdom . |

*Primary Examiner*—Paul J. Thibodeau
*Assistant Examiner*—Stephen Sand
*Attorney, Agent, or Firm*—Wenderoth, Lind & Ponack

[57] ABSTRACT

A polypropylene-laminated steel sheet is provided which is less liable to cause whitening on receiving impact shock and is superior in resistance to corrosion. A process for producing the polypropylene-laminated steel sheet is also provided. The polypropylene-laminated steel sheet comprises, at least on one side of the steel sheet, a layer (A) of modified polypropylene grafted with an unsaturated carboxylic acid, and, if desired, a layer (B) of polypropylene formed additionally on the layer (A), the modified polypropylene of the layer (A) and the polypropylene of the layer (B) having crystallinity of not more than 55%. The modified steel sheet is produced by the process which comprises melt-extruding and laminating a modified polypropylene (A) grafted with an unsaturated carboxylic acid on at least one side of a preheated steel sheet, and, if desired, a polypropylene (B) further thereon, and cooling the steel sheet, the modified polypropylene (A) and the polypropylene (B) together at a cooling rate of not less than 20° C./sec at least in the temperature range of from 100° C. to 55° C.

2 Claims, No Drawings

POLYPROPYLENE-LAMINATED STEEL SHEET AND PRODUCTION THEREOF

BACKGROUND OF THE INVENTION

1. Field of the Invention

The present invention relates to a polypropylene-laminated steel sheet which is excellent in resistance to peeling, resistance to impact-whitening, and resistance to corrosion of worked portions, and to a process for producing the laminated steel sheet. More specifically, the present invention relates to a polypropylene-laminated steel sheet suitable for containers such as 18-liter cans and aerosol cans, and a process for producing the laminated steel sheet.

2. Description of the Related Art

In a polypropylene-laminated metal sheet, the resistance to peeling of a polypropylene film from a metal sheet such as a steel sheet is improved by use of a polypropylene modified by grafting with an unsaturated carboxylic acid as is disclosed in the prior art publications, e.g., Japanese Patent Publication No. Sho 49-4822, and Japanese Patent Application Laid-Open Nos. Sho 54-90378 and Sho 57-197156. The polypropylene-laminated steel sheet produced by the processes disclosed in the prior art publications involve the problem that the laminated resin layer becomes whitened by impact shock at pressing or other working.

The whitening of the polypropylene laminated layer caused upon impact shock such as during press workings is considered to be attributed to microcracks occurring in the polypropylene layer on receiving impact shock and resultant light scattering at the microcrack portions, or to be attributed to crystallization of the polypropylene resin by stress concentration on application of impact shock and resultant light scattering at the interface between crystalline portions and non-crystalline portions. Once the whitening occurs not only the external appearance of the laminated steel sheet is impaired but also corrosion is initiated from the site of the microcracks, thus lowering the corrosion resistance thereof.

Generally, the polypropylene-laminated steel sheet has been considered to have high corrosion resistance. Therefore, it has been believed that a stress-crack-inducing substance can be packed and stored in a container made of a polypropylene-laminated steel sheet without any problem. However, it has been found that rust is formed around the press-worked portion of a can when a surfactant-containing solution which tends to cause stress-cracking is packed and stored in the can, e.g., a 18-liter can, made of a polypropylene-laminated steel sheet according to the method of the above-mentioned Japanese Patent Laid-Open Publications. This means that the above laminated steel sheet is inferior in corrosion resistance.

SUMMARY OF THE INVENTION

The present invention intends to provide a polypropylene-laminated steel sheet which is less liable to cause peeling on application of impact shock such as pressing, and is less liable to cause whitening and is superior in corrosion resistance.

The present invention also intends to provide a process for producing the above propylene-laminated steel sheet.

According to an aspect of the present invention, there is provided a polypropylene-laminated steel sheet comprising, at least on one side of the steel sheet, a layer (A) of modified polypropylene grafted with an unsaturated carboxylic acid, the modified polypropylene resin of the layer (A) having crystallinity of not more than 55%.

According to another aspect of the present invention, there is provided a polypropylene-laminated steel sheet comprising, at least on one side of the steel sheet, a layer (A) of modified polypropylene grafted with an unsaturated carboxylic acid, and a layer (B) of polypropylene formed on the layer (A), the modified polypropylene of the layer (A) and the polypropylene of the layer (B) having crystallinity of not more than 55% respectively.

According to a further aspect of the present invention, there is provided a process for producing a polypropylene-laminated steel sheet, comprising meltextruding and laminating a modified polypropylene (A) grafted with an unsaturated carboxylic acid on at least one side of a preheated steel sheet, and cooling the steel sheet and the modified polypropylene (A) at a cooling rate of not less than 20° C./sec at least in the temperature range of from 100° C. to 55° C.

According to a still further aspect of the present invention, there is provided a process for producing a polypropylene-laminated steel sheet, comprising melt-extruding and laminating a modified polypropylene (A) grafted with an unsaturated carboxylic acid on at least one side of a preheated steel sheet, and a polypropylene (B) further thereon, and cooling the steel sheet, the modified polypropylene (A) and the polypropylene (B) together at a cooling rate of not less than 20° C./sec at least in the temperature range of from 100° C. to 55° C.

DETAILED DESCRIPTION OF THE PREFERRED EMBODIMENT

The steel sheet used in the present invention includes electric tinned steel sheets (steel sheets electrically plated with tin of 0.5 to 12 $g/m^2$), TFS (tin-free steel sheet electrically plated with chromium of 30 to 120 $mg/m^2$) which have conventionally been used as can materials, and nickel-plated steel sheets, but is not limited thereto.

The modified polypropylene (A) which is modified by grafting with an unsaturated carboxylic acid of the present invention is crystallizable, and preferably exhibits a melt flow rate (MFR; ASTM D1238L) in the range of from 0.1 to 100 g/10 min. The modified polypropylene comprises, as a backbone polymer, a homopolymer of propylene or a block or random copolymer of propylene with a small amount of other olefins such as ethylene, 1-butene, 4-methyl-1-pentene, 1-heptene, 1-hexene, and 1-octene, the whole or a part of the homopolymer or the copolymer being modified by grafting with a graft monomer selected from unsaturated carboxylic acids and derivatives thereof in a grafting amount of from 0.001 to 10% by weight, preferably from 0.1 to 5% by weight. Among them, preferred are modified polypropylene homopolymers and modified random propylene copolymers, in particular, random propylene copolymers and an α-olefin such as ethylene and 1-butene with a propylene unit ratio of from 99.5 to 93 mol %, since these modified copolymers have high resistance to the whitening on application of impact shock.

The unsaturated carboxylic acids include acrylic acid, maleic acid, fumaric acid, tetrahydrophthalic acid, itaconic acid, citraconic acid, crotonic acid, isocrotonic acid, najic acid (endo-cis-bicyclo [2.2.1] hept-5-ene-2,3-dicarboxylic acid), and the like. The derivatives of the unsaturated carboxylic acid include halides, amides, imides, anhydride, esters, and the like of the acids. Specific examples are maleoyl chloride, maleimide, maleic anhydride, methyl acrylate, methyl methacrylate, citraconic anhydride, methyl hydrogen maleate, dimethyl maleate, and glycidyl maleate. Among them, unsaturated carboxylic acids and their acid anhydrides are preferred. Maleic acid, najic acid, and their acid anhydrides are particularly preferred.

The modified polypropylene (A) is produced by graft-copolymerizing a graft monomer selected from the aforementioned unsaturated carboxylic acids and derivatives thereof onto polypropylene through a known process. The process includes graft copolymerization by addition of a graft monomer to molten polypropylene; and graft copolymerization by addition of a graft monomer to a solution of polypropylene in a solvent. In any production process, in order to carry out the graft copolymerization efficiently, the copolymerization reaction is preferably allowed to proceed in the presence of a radical initiator. The graft copolymerization reaction is practiced usually at a temperature ranging from 60° to 350° C. The amount of the radical initiator to be used is in the range of from 0.001 to 1 parts by weight to 100 parts by weight of the polypropylene.

The preferred radical initiators include organic peroxides and organic peracid esters such as benzoyl peroxide, dichlorobezoyl peroxide, dicumyl peroxide, di-t-butyl peroxide, 2,5-dimethyl-2, 5-di(peroxydobenzoate)hexyne-3, 1,4-bis(t-butylperoxyisopropyl)benzene, lauroyl peroxide, t-butyl peracetate, 2,5-dibutyl-2,5-di(t-butylperoxy)hexyne-3, 2,5-dimethyl-2,5-di(t-butylperoxy)hexane, t-butyl perbenzoate, t-butyl perphenylacetate, t-butyl perisobutylate, t-butyl per-s-octoate, t-butyl perpivalate, cumyl perpivalate, and t-butyl perdiethylacetate; and azo compounds such as azoisobutyronitrile; and dialbenzene oxide such as dimethylamyl peroxide, di-t-butyl peroxide, 2,5-dimethyyl -2,5-di(t-butylperoxy)hexyne-3, 2,5-dimethyl-2,5-di(t-butylperoxy)hexane, and 1,4-bis(t-butylperoxyisopropyl)benzene.

The modified polypropylene (A) employed in the present invention may be an unsaturated carboxylic acid-modified polypropylene itself or may be a composition composed of an unsaturated carboxylic acid-modified polyporpylene and an unmodified polypropylene. In the case of the composition, the amount of the graft monomer is usually in the range of from 0.001 to 10% by weight of the entire composition.

The polypropylene (B) employed in the present invention is crystallizable, and has preferably a density of from 0.89 to 0.93 g/cm$^3$, and a melt flow rate (MFR) of from 0.1 to 100 g/10 min, and includes propylene homopolymers; block copolymers of propylene with other α-olefin such as ethylene, 1-butene, 4-methyl-1-pentene, 1-heptene, 1-hexene, and 1-octene at a propylene unit ratio of not more than 30 mol %, preferably not more than 10 mol %; and random copolymers of propylene and a small amount of α-olefin. Among them, homopolymers and random copolymers are preferred.

The modified polypropylene (A) grafted with an unsaturated carboxylic acid, and the polypropylene (B) may contain a heat-stabilizer, a weathering agent, an antistatic agent, a pigment or dye, and a polymer such as high-pressure low-density polyethylene, linear low-density polyethylene, high-density polyethylene, a low-crystalline or amorphous ethylene-α-olefin random copolymer, and a propylene-α-olefin random copolymer in such an amount that the effect of the present invention is not impaired.

The thicknesses of the layer of the modified polypropylene (A) grafted with an unsaturated carboxylic acid and the layer of the polypropylene (B) to coat the steel sheet are decided depending on intended final applications of the steel sheet, and are not specially limited. When a layer of the modified polypropylene (A) is applied as a single coating layer, the thickness is usually form 10 to 300 μm, preferably from 20 to 200 μm. When layers of the modified polypropylene (A) and the polypropylene (B) are applied in lamination, the thickness of the layer of the modified polypropylene (A) is usually from 5 to 70 μm, preferably from 5 to 50 μm, and the thickness of the layer of the polypropylene (B) is usually from 5 to 295 μm, preferably 5 to 150 μm.

The modified polypropylene (A), or a combination of the modified polyethylene (A) and the polypropylene (B) is applied for coating at least one side of the steel sheet. However both sides of the steel sheet may be coated depending on intended final applications thereof. In the case where one side is coated, the other side may be not coated, or coated with an epoxy resin or other thermoplastic resin.

The polypropylene-laminated steel sheet according to the present invention will be described below.

The resin layer of the modified polypropylene (A) grafted with an unsaturated carboxylic acid, or the laminated resin layers composed of a lower layer of the modified polypropylene (A) grafted with unsaturated carboxylic acid and an upper layer of the polypropylene resin (B) should have a crystallinity of not more than 55% respectively. With the crystallinity of the resin layer of 55% or lower, the resin layer has excellent corrosion resistance, and the laminated steel sheet does not form rust even when the portion of the resin having stress is immersed in a surfactant solution. On the contrary, if the crystallinity of the resin layer is higher than 55%, the corrosion resistance is low, and the laminated steel sheet comes to have rust in a surfactant solution. This is considered to be due to the fact that the resin layer having higher crystallinity exhibits lower elongation, being liable to form stress cracks on application of stress.

The whitening of the resin on application of impact shock also depends on the crystallinity of the resin layer. With the crystallinity of higher than 55%, the crystals in the resin layer are larger, which causes slippage deformation at the crystal surface on application of impact, resulting in decrease of resistance to whitening.

The crystallinity in the present invention is measured by the procedure below:

(1) The intensity of X-ray diffraction of the resin layer is measured in the range of 2θ=10 of from 5 to 40, (2) The base line is drawn by connecting the points on the X-ray diffraction line at 2θ=10 and 2θ=35 with a straight line.

(3) A polypropylene resin having a composition considered to be the same as the lamination resin layer is made nearly completely amorphous by melting the resin and throwing it into liquid nitrogen or by another procedure. The intensity of X-ray diffraction of this resin is measured under the same condition as in the step (1) above.

(4) A smooth curve is drawn at the base portion of the diffraction peak of the diffraction intensity line obtained in the step (1) above in such a manner that the shape of the curve is similar to the diffraction intensity curve of the amorphous sample obtained in the step (3) above.

(5) The area of the portion surrounded by the base line of the step (2) and the curve of the step (4) is represented by 1a, and the area of the portion surrounded by the diffraction intensity line of the step (1) and the curve of the step (4) is represented by 1c.

(6) The degree of crystallinity is calculated from

[1c/1a+1c]×100

When the polypropylene-laminated steel sheet of the present invention is subjected to the impact test of Du Pont method (JIS K5400) in which the impact load of 500 g is dropped from the height of 30 cm onto the opposite side to the resin layer, the whitened area at the portion of the resin protruded by the impact should be less than 50%. If the whitened area is 50% or more, the whitening is prominent, giving undesired appearance.

The process of producing the propylene-laminated steel sheet of the present invention is described below.

By use of an extruder, the modified polypropylene (A) is melted and extruded though a die, preferably a T-die, in a film shape onto a preheated steel sheet to form a lamination film thereon. The temperature of the extrusion of the modified propylene (A) is in the range of from 200° to 270° C.

In the case where polypropylene (B) is further laminated on the layer of the modified polypropylene (A), the lamination may be conducted by a tandem lamination method in which the modified polypropylene is extruded onto the steel sheet to form a lamination film and subsequently the propylene (B) is extruded thereon to form a further lamination film, or may be conducted by a coextrusion multilayer lamination method in which the modified polypropylene (A) and the polypropylene (B) are simultaneously extruded onto the steel sheet by use of a multiple die to form lamination films. The extrusion temperature in this case is also in the range of from 200° to 270° C.

The steel sheet is desirably preheated to a temperature of from 100° to 160° C. An excessively high preheating temperature is disadvantageous in cost, while a lower temperature is unsatisfactory because the minimum temperature of 100° C. for the initiation of quenching cannot be obtained.

The temperature of initiating the quenching of the laminated steel sheet is discussed below.

The temperature of the modified polypropylene or the combination of the modified polypropylene with the unmodified polypropylene becomes nearly equal to the preheating temperature of the steel sheet immediately after the lamination because of the larger heat capacity of the steel sheet, although the resin extrusion temperature is from 200° to 270° C. Therefore, when the steel sheet is preheated to 140° C., the applied modified polypropylene cools down from 140° C. slowly (about 1° to 2° C./sec) in the atmosphere. The modified polypropylene needs to be quenched before the modified polypropylene (A), etc. cools to 100° C. or lower. Since the modified polypropylene (A), etc. crystallize rapidly from about 100° C., it is important to quench the resin before the crystallization begins in order to retard the crystallization of the modified polypropylene (A), etc. and to obtain the crystallinity of not more than 55%. If the resin is quenched from a temperature below 100° C., the state of whitening on application of stress and the corrosion resistance is nearly equal to one which has not been quenched. Since the cooling condition is variable, the quenching is preferably initiated at about 120° C. to stably produce a laminated steel sheet which is superior in impact strength and corrosion resistance.

The quenching of the laminated steel sheet needs to be continued, after the initiation of the quenching, to a temperature of 55° C. or lower, preferably 30° C. or lower in terms of the temperature of the modified polypropylene (A), etc. If the quench termination temperature is higher than 55° C., the crystallization of the modified polypropylene (A), etc. cannot be prevented even with the quenching, resulting in the crystallinity exceeding 55% with whitening on impact application and corrosion resistance unimproved in comparison with the case of non-quenching. It is preferred to continue quenching to a temperature below 30° C. since the crystallization of the modified polypropylene (A), etc. is more completely suppressed, thereby lowering the degree of whitening on impact application in comparison with the case of quench termination at about 50° C.

The cooling rate is discussed below.

As described above, quenching is necessary to retard the crystallization and to obtain the crystallinity of not higher than 55%. The cooling rate has been found necessary to be higher than 20° C./sec, preferably than 100° C./sec to retard the crystallization and to obtain the crystallinity of not higher than 55%. If the cooling rate is lower than 20° C./sec, the crystallization cannot surely be retarded even if the quenching is conducted from a temperature higher than 100° C., and occasionally the whitening on impact application and corrosion resistance will not be improved. The necessary cooling rate depends on the kind of the modified polypropylene (A), etc. to some extent. In the case where a grafted polypropylene or a grafted random propylene copolymer is employed, even the cooling rate of about 20° C./sec is sufficient to suppress the whitening on impact application.

The method of the cooling includes air cooling with a fan or the like, water cooling with a water nozzle, immersion in water, and so forth, but is not limited thereto provided that the above cooling conditions are satisfied.

In the case where only one side of the steel sheet is laminated with a modified polypropylene (A), etc., the quenching is preferably practiced from the non-laminated side of the steel sheet. If the lamination is sufficiently thin, no problem arises whether the quenching is practiced from the front side or the back side, while, when the lamination is thick, whitening on impact application may occur if the quenching is practiced at the laminated surface side, because of the low thermal conductivity and slow cooling the of interior of the modified polypropylene (A), etc.

EXAMPLE 1

A low carbon steel sheet 0.32 mm thick was plated thinly with chromium (100 mg/m$^2$). Onto one side thereof, an aqueous dispersion of an acryl-modified epoxy resin (trade name T-152W, made by Dainippon Ink and Chemicals, Inc.) was applied and baked to form a resin layer 5 μm thick. Then onto the other side of the sheet which was preheated to about 140° C. at the above baking, the resins below were applied to form a lamination layer by a T-die extrusion method (extruder method). Directly on the steel sheet, a modified propylene-ethylene copolymer resin (modified random copolymer) which had been modified with maleic acid for improvement of adhesiveness (MFR=8.1 g/10 min, $C_2$=3.5 mol %, M value=0.3 wt %) was extruded in a thickness of from 5 to 50 μm, and further thereon a propylene-ethylene copolymer resin (random copolymer: MFR= 6.9 g/10 min, $C_2$=3.5 mol %) was coextruded in a thickness of from 5 to 150 μm. The steel sheet and the resin extruded thereon was at a temperature of 140° C. immediately after the lamination. Then the resin was cooled under the conditions shown in Table 1. The dried laminated steel sheet was evaluated for the resistance to whitening and corrosion resistance.

Table 1 shows the results.

[Notes to Tables]

1* Evaluation of resistance to whitening: The evaluation was conducted according to JIS-K5400. The impact was applied to the backside of the laminated surface to be evaluated.

Impact tip : ½ inch hemisphere
Load : 500 g
Dropping height : 30 cm

Evaluation mark:
No whitening 10
Whitening over entire protruded portion 0

2* Cooling rate:

The cooling rate was calculated for the time from the initiation of cooling to the termination of cooling. From immediately after the lamination (140° C.) to the initiation of cooling, the sheet was allowed to cool by standing (cooling rate: 1° C./sec).

3* Crystallinity:

The crystallinity of the resin layer was measured by X-ray diffraction of the laminated steel sheet.

4* Elongation at break:

The laminated steel sheet was etched with a weakly acidic solution to dissolve the steel sheet, and the film layer only was separated. The film was subjected to measurement of the elongation at break according to ASTM-D638.

5* Evaluation of resistance to corrosion:

The test specimen was punched out in a size of 57 mm diameter from the laminated sheet. The punched specimen is subjected to Erichsen extrusion working in 5 mm in such a manner that the lamination face comes to be protruded. The specimen is set in a cell container, into which a surfactant solution (effective concentration: 25%) was filled to the ⅓ volume of the container. The cell container is kept standing in a thermostatic chamber at 40° C. for one month. After one month of standing, the lamination surface is observed.

Evaluation mark: o : no change
x : rust found at Erichsen portion

Table 1 shows that the resistance to whitening and the corrosion resistance were excellent in Examples 1–1 to 1–9. However, the resistance to whitening was extremely low and corrosion resistance was poor in Comparative examples 1–1 to 1–4 where the cooling rate does not meet the requirement of the present invention and the crystallinity is higher than 55%, in Comparative example 1–5 where the cooling initiation temperature does not meet the requirement and the crystallinity is higher than 55%, and in Comparative examples 1–6 where the cooling termination temperature does not meet the requirement and the crystallinity is higher than 55%.

EXAMPLE 2

A low carbon steel sheet 0.32 mm thick was plated thinly with chromium (100 mg/m$^2$). Onto one side thereof, an aqueous dispersion of an acryl-modified epoxy resin (trade name T-152W, made by Dainippon Ink and Chemicals, Inc.) was applied and baked to form a resin layer 5 μm thick. Then onto the other side of the sheet which was preheated to about 140° C. at the above baking, the resins below were applied to form a lamination layer by a T-die extrusion method (extruder method). Directly on the steel sheet, a modified propylene-ethylene copolymer resin (modified random copolymer) which had been modified with maleic acid for improvement of adhesiveness (MFR=10 g/10 min, C$_2$=1.5 mol %, M value=0.2 wt %) was extruded in a thickness of from 5 to 50 μm, and further thereon a propylene-ethylene copolymer resin (random copolymer: MFR=5.9 g/10 min, C$_2$=4.8 mol %) was coextruded in a thickness of from 5 to 150 μm. The steel sheet and the resin extruded thereon was at a temperature of 140° C. immediately after the lamination. Then the resin was cooled under the conditions shown in Table 2. The dried laminated steel sheet was evaluated for the resistance to whitening and corrosion resistance.

Table 2 shows the results. The resistance to whitening and the corrosion resistance were excellent in Examples 1–1 to 1–9. However, the resistance to whitening was extremely low and corrosion resistance was poor in Comparative examples 1–1 to 1–4 where the cooling rate does not meet the requirement of the present invention and the crystallinity is higher than 55%, in Comparative example 1–5 where the cooling initiation temperature does not meet the requirement and the crystallinity is higher than 55%, and in Comparative examples 1–6 where the cooling termination temperature does not meet the requirement and the crystallinity is higher than 55%.

EXAMPLE 3

A low carbon steel sheet 0.32 mm thick was plated thinly with chromium (100 mg/m$^2$). Onto one side thereof, an aqueous dispersion of an acryl-modified epoxy resin (trade name T-152 W, made by Dainippon Ink and Chemicals, Inc.) was applied and baked to form a resin layer 5 μm thick. Then onto the other side of the sheet which was preheated to about 140° C. at the above baking, the resins below were applied to form a lamination layer by a T-die extrusion method (extruder method). Directly on the steel sheet, a modified propylene-ethylene copolymer resin (modified block copolymer) which had been modified with maleic acid for improvement of adhesiveness (MFR=7.0 g/10 min, C$_2$=11 mol %, maleic anhydride=0.2 wt %) was extruded in a thickness of from 5 to 50 μm, and further thereon a propylene-ethylene copolymer resin (block copolymer: MFR=21 g/10 min, C$_2$=14 mol %) was coextruded in a thickness of from 5 to 150 μm. The steel sheet and the resin extruded thereon was at a temperature of 140° C. immediately after the lamination. Then the resin was cooled under the conditions shown in Table 3. The dried laminated steel sheet was evaluated for the resistance to whitening and resistance to corrosion (resistance to stress cracking).

Table 3 shows the results. The resistance to whitening and the corrosion resistance were excellent in Examples 1–1 to 1–9. However, the resistance to whitening was extremely low and corrosion resistance was poor in Comparative examples 1–1 to 1–4 where the cooling rate does not meet the requirement of the present invention and the crystallinity is higher than 55%, in Comparative example 1–5 where the cooling initiation temperature does not meet the requirement and the crystallinity is higher than 55%, and in Comparative examples 1–6 where the cooling termination temperature does not meet the requirement and the crystallinity is higher than 55%.

Example 4

A low carbon steel sheet 0.32 mm thick was plated thinly with chromium (100 mg/m$^2$). Onto one side thereof, an aqueous dispersion of an acryl-modified epoxy resin (trade name T-152 W, made by Dainippon Ink and Chemicals, Inc.) was applied and baked to form a resin layer 5 μm thick. Then onto the other side of the sheet which was preheated to about 140° C. at the above baking, the resins below were applied to form a lamination layer by a T-die extrusion method (extruder method). On the steel sheet, a modified propylene-ethylene copolymer resin (modified random copolymer) which had been modified with maleic acid for improvement of adhesiveness (MFR=8.1 g/10 min, $C_2$=3.5 mol %, M value=0.3 wt %) was extruded in a thickness of 50 μm in a single layer. The steel sheet and the resin extruded thereon was a temperature of 140° C. immediately after the lamination. Then the resin was cooled under the conditions shown in Table 4. The dried laminated steel sheet was evaluated for the resistance to whitening and resistance to corrosion.

Table 4 shows the results. The resistance to whitening and the resistance to stress cracking were excellent in Examples 1–1 to 1–3. However, the resistance to whitening was extremely low and corrosion resistance was poor in Comparative examples 1–1 and 1–2 where the cooling rate does not meet the requirement of the present invention and the crystallinity is higher than 55%, in Comparative example 1–3 where the cooling initiation temperature does not meet the requirement and the crystallinity is higher than 55%, and in Comparative examples 1–4 where the cooling termination temperature does not meet the requirement and the crystallinity is higher than 55%.

As described above, the present invention provides a polypropylene-laminated steel sheet which is less liable to cause whitening or does not cause whitening at all on receiving impact shock and has excellent corrosion resistance, and a process for producing the polypropylene-laminated steel sheet.

TABLE 1

| | Resin thickness in total (μm) | Cooling method | Cooling rate 2* (°C./sec) | Cooling initiation temperature (°C.) | Cooling termination temperature (°C.) | Resistance to whitening 1* | Crystallinity 3* (%) | Elongation at break 4* (%) | Resistance to corrosion 5* |
|---|---|---|---|---|---|---|---|---|---|
| Example | | | | | | | | | |
| 1-1 | 20 | dipped in water | 400 | 120 | 30 | 10 | 20.4 | 610 | O |
| 1-2 | 100 | dipped in water | 400 | 120 | 30 | 10 | 28.8 | 600 | O |
| 1-3 | 200 | dipped in water | 400 | 120 | 30 | 10 | 25.0 | 650 | O |
| 1-4 | 20 | water-cooled at non-laminated surface | 100 | 120 | 30 | 10 | 30.0 | 620 | O |
| 1-5 | 100 | water-cooled at non-laminated surface | 100 | 120 | 30 | 10 | 33.0 | 640 | O |
| 1-6 | 200 | water-cooled at non-laminated surface | 100 | 120 | 30 | 10 | 35.5 | 610 | O |
| 1-7 | 20 | cooled by air-nozzle at non-laminated surface | 20 | 120 | 30 | 9 | 50.1 | 630 | O |
| 1-8 | 100 | cooled by air-nozzle at non-laminated surface | 20 | 120 | 30 | 8 | 51.7 | 670 | O |
| 1-9 | 200 | cooled by air-nozzle at non-laminated surface | 20 | 120 | 30 | 8 | 54.1 | 640 | O |
| Comparative Example | | | | | | | | | |
| 1-1 | 20 | left standing | 1 | 140 | 30 | 1 | 61.5 | 320 | X |
| 1-2 | 100 | left standing | 1 | 140 | 30 | 0 | 61.1 | 350 | X |
| 1-3 | 200 | left standing | 1 | 140 | 30 | 0 | 62.1 | 310 | X |
| 1-4 | 100 | cooled by air-nozzle weakly at non-laminated surface | 10 | 120 | 30 | 1 | 58.0 | 360 | X |
| 1-5 | 100 | water-cooled at non-laminated surface | 100 | 90 | 30 | 0 | 60.5 | 340 | X |
| 1-6 | 100 | water-cooled at non-laminated surface | 100 | 120 | 60 | 1 | 58.2 | 360 | X |

TABLE 2

| | Resin thickness in total (μm) | Cooling method | Cooling rate 2* (°C./sec) | Cooling initiation temperature (°C.) | Cooling termination temperature (°C.) | Resistance to whitening 1* | Crystallinity 3* (%) | Elongation at break 4* (%) | Resistance to corrosion 5* |
|---|---|---|---|---|---|---|---|---|---|
| Example | | | | | | | | | |

TABLE 2-continued

| | Resin thickness in total (μm) | Cooling method | Cooling rate 2* (°C./sec) | Cooling initiation temperature (°C.) | Cooling termination temperature (°C.) | Resistance to whitening 1* | Crystallinity 3* (%) | Elongation at break 4* (%) | Resistance to corrosion 5* |
|---|---|---|---|---|---|---|---|---|---|
| 1-1 | 20 | dipped in water | 400 | 120 | 30 | 9 | 20.1 | 620 | ○ |
| 1-2 | 100 | dipped in water | 400 | 120 | 30 | 8 | 15.7 | 660 | ○ |
| 1-3 | 200 | dipped in water | 400 | 120 | 30 | 8 | 21.1 | 630 | ○ |
| 1-4 | 20 | water-cooled at non-laminated surface | 100 | 120 | 30 | 9 | 35.0 | 670 | ○ |
| 1-5 | 100 | water-cooled at non-laminated surface | 100 | 120 | 30 | 8 | 34.0 | 640 | ○ |
| 1-6 | 200 | water-cooled at non-laminated surface | 100 | 120 | 30 | 8 | 34.5 | 610 | ○ |
| 1-7 | 20 | cooled by air-nozzle at non-laminated surface | 20 | 120 | 30 | 7 | 51.0 | 620 | ○ |
| 1-8 | 100 | cooled by air-nozzle at non-laminated surface | 20 | 120 | 30 | 6 | 48.5 | 650 | ○ |
| 1-9 | 200 | cooled by air-nozzle at non-laminated surface | 20 | 120 | 30 | 6 | 53.4 | 600 | ○ |
| Comparative Example | | | | | | | | | |
| 1-1 | 20 | left standing | 1 | 140 | 30 | 1 | 59.7 | 320 | X |
| 1-2 | 100 | left standing | 1 | 140 | 30 | 0 | 62.0 | 350 | X |
| 1-3 | 200 | left standing | 1 | 140 | 30 | 0 | 60.2 | 360 | X |
| 1-4 | 100 | cooled by air-nozzle weakly at non-laminated surface | 10 | 120 | 30 | 0 | 59.0 | 360 | X |
| 1-5 | 100 | water-cooled at non-laminated surface | 100 | 90 | 30 | 0 | 61.1 | 340 | X |
| 1-6 | 100 | water-cooled at non-laminated surface | 100 | 120 | 60 | 0 | 58.2 | 360 | X |

TABLE 3

| | Resin thickness in total (μm) | Cooling method | Cooling rate 2* (°C./sec) | Cooling initiation temperature (°C.) | Cooling termination temperature (°C.) | Resistance to whitening 1* | Crystallinity 3* (%) | Elongation at break 4* (%) | Resistance to corrosion 5* |
|---|---|---|---|---|---|---|---|---|---|
| Example | | | | | | | | | |
| 1-1 | 20 | dipped in water | 400 | 120 | 30 | 8 | 20.7 | 620 | ○ |
| 1-2 | 100 | dipped in water | 400 | 120 | 30 | 7 | 22.4 | 660 | ○ |
| 1-3 | 200 | dipped in water | 400 | 120 | 30 | 7 | 20.1 | 650 | ○ |
| 1-4 | 20 | water-cooled at non-laminated surface | 100 | 120 | 30 | 7 | 35.0 | 620 | ○ |
| 1-5 | 100 | water-cooled at non-laminated surface | 100 | 120 | 30 | 6 | 40.0 | 630 | ○ |
| 1-6 | 200 | water-cooled at non-laminated surface | 100 | 120 | 30 | 6 | 38.7 | 610 | ○ |
| 1-7 | 20 | cooled by air-nozzle at non-laminated surface | 20 | 120 | 30 | 6 | 52.0 | 590 | ○ |
| 1-8 | 100 | cooled by air-nozzle at non-laminated surface | 20 | 120 | 30 | 5 | 51.0 | 620 | ○ |
| 1-9 | 200 | cooled by air- | 20 | 120 | 30 | 5 | 54.2 | 600 | ○ |

TABLE 3-continued

| | Resin thickness in total (μm) | Cooling method | Cooling rate 2* (°C./sec) | Cooling initiation temperature (°C.) | Cooling termination temperature (°C.) | Resistance to whitening 1* | Crystallinity 3* (%) | Elongation at break 4* (%) | Resistance to corrosion 5* |
|---|---|---|---|---|---|---|---|---|---|
| | | nozzle at non-laminated surface | | | | | | | |
| Comparative Example | | | | | | | | | |
| 1-1 | 20 | left standing | 1 | 140 | 30 | 1 | 61.1 | 290 | X |
| 1-2 | 100 | left standing | 1 | 140 | 30 | 0 | 59.8 | 300 | X |
| 1-3 | 200 | left standing | 1 | 140 | 30 | 0 | 62.3 | 310 | X |
| 1-4 | 100 | cooled by air-nozzle weakly at non-laminated surface | 10 | 120 | 30 | 0 | 61.0 | 310 | X |
| 1-5 | 100 | water-cooled at non-laminated surface | 100 | 90 | 30 | 0 | 62.1 | 320 | X |
| 1-6 | 100 | water-cooled at non-laminated surface | 100 | 120 | 60 | 0 | 58.3 | 280 | X |

TABLE 4

| | Resin thickness in total (μm) | Cooling method | Cooling rate 2* (°C./sec) | Cooling initiation temperature (°C.) | Cooling termination temperature (°C.) | Resistance to whitening 1* | Crystallinity 3* (%) | Elongation at break 4* (%) | Resistance to corrosion 5* |
|---|---|---|---|---|---|---|---|---|---|
| Example | | | | | | | | | |
| 1-1 | 50 | dipped in water | 400 | 120 | 30 | 10 | 25.0 | 590 | O |
| 1-2 | 50 | water-cooled at non-laminated surface | 100 | 120 | 30 | 10 | 31.0 | 600 | O |
| 1-3 | 50 | cooled by air-nozzle at non-laminated surface | 20 | 120 | 30 | 10 | 49.1 | 610 | O |
| Comparative Example | | | | | | | | | |
| 1-1 | 50 | left standing | 1 | 140 | 30 | 1 | 61.5 | 290 | X |
| 1-2 | 50 | cooled by air-nozzle weakly at non-laminated surface | 10 | 120 | 30 | 2 | 58.7 | 210 | X |
| 1-3 | 50 | water-cooled at non-laminated surface | 100 | 90 | 30 | 1 | 58.7 | 280 | X |
| 1-4 | 50 | water-cooled at non-laminated surface | 100 | 120 | 60 | 1 | 60.2 | 310 | X |

What is claimed is:

1. A process for producing a polypropylene-laminated steel sheet, comprising melt-extruding a modified polypropylene grafted with an unsaturated carboxylic acid at a resin temperature of 200°–270° C. directly on at least one side of a steel sheet preheated to a temperature of 100°–160° C. to laminate the melt-extruded modified polypropylene on the steel sheet, and cooling the steel sheet together with the modified polypropylene to a temperature of 55° C. or lower, at a cooling rate of not less than 20° C./sec at least in a temperature range from 100° C. to 55° C.

2. A process for producing a polypropylene-laminated steel sheet, comprising melt-extruding a modified polypropylene grafted with an unsaturated carboxylic acid (A) at a resin temperature of 200°–270° C. directly on at least one side of a steel sheet preheated to a temperature of 100°–160° C. to laminate the melt-extruded A on the steel sheet, melt-extruding and laminating polypropylene (B) at a resin temperature of 200°–270° C. on the laminated A, and cooling the steel sheet together with said A and B to a temperature of 55° C. or lower, at a cooling rate of not less than 20° C./sec at least in a temperature range from 100° C. to 55° C.

* * * * *